(12) United States Patent  
Brownlow et al.

(10) Patent No.: US 8,495,274 B2  
(45) Date of Patent: Jul. 23, 2013

(54) ADDRESS TRANSLATION TABLE TO ENABLE ACCESS TO VIRTUAL FUNCTIONS

(75) Inventors: Sean T. Brownlow, Rochester, MN (US); Travis J. Pizel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 12/962,882

(22) Filed: Dec. 8, 2010

(65) Prior Publication Data

US 2012/0151178 A1 Jun. 14, 2012

(51) Int. Cl.
*G06F 12/00* (2006.01)

(52) U.S. Cl.
USPC .................. 711/6; 711/202; 711/206

(58) Field of Classification Search
USPC ............................. 711/6, 202, 206
See application file for complete search history.

(56) References Cited

U.S. PATENT DOCUMENTS

| | | | |
|---|---|---|---|
| 2006/0195642 A1* | 8/2006 | Arndt et al. ................... | 710/240 |
| 2009/0037941 A1* | 2/2009 | Armstrong et al. ........... | 719/328 |
| 2009/0210646 A1* | 8/2009 | Bauman et al. ............... | 711/170 |
| 2009/0248937 A1 | 10/2009 | Solomon et al. | |
| 2009/0276773 A1 | 11/2009 | Brown et al. | |
| 2009/0313391 A1 | 12/2009 | Watanabe | |
| 2010/0014526 A1 | 1/2010 | Chavan et al. | |
| 2010/0082874 A1 | 4/2010 | Baba et al. | |
| 2010/0095310 A1 | 4/2010 | Oshins | |
| 2010/0180274 A1 | 7/2010 | Cherian et al. | |
| 2012/0151178 A1* | 6/2012 | Brownlow et al. ............ | 711/206 |

* cited by examiner

*Primary Examiner* — Reginald Bragdon  
*Assistant Examiner* — Mehdi Namazi  
(74) *Attorney, Agent, or Firm* — Toler Law Group

(57) ABSTRACT

In response to detecting a PCI host bridge (PHB), a first address translation table may be allocated in a first portion of a memory. The first address translation table may be associated with the PHB. If an input/output adapter accessible to the PHB is configured as a virtualized adapter, a first table manager may be assigned to manage the first address translation table. The first address translation table may be configured for an initial number of virtual functions. If a requested number of virtual functions is greater than the initial number of virtual functions, additional virtual functions may be configured. A second address translation table may be allocated in a second portion of the memory. The second portion of the memory may be non-contiguous with reference to the first portion of the memory. Entries may be created in the second address translation table for the additional virtual functions.

20 Claims, 8 Drawing Sheets

ADDRESS TRANSLATION TABLE TO ENABLE ACCESS TO VIRTUAL FUNCTIONS

FIELD OF THE DISCLOSURE

The present disclosure relates generally to computer systems, and more particularly, to managing virtual functions that are hosted by a virtualized I/O adapter.

BACKGROUND

In a computer system that uses a non-virtualized input/output (I/O) adapter, an address translation table may be allocated and assigned to a logical partition. An operating system and applications executing in the logical partition may use the address translation table to perform input/output operations via the non-virtualized I/O adapter.

In a computer system that uses a virtualized I/O adapter, the virtualized I/O adapter may provide multiple virtual I/O adapters to multiple logical partitions to enable the multiple logical partitions to access the virtual functions. An address translation table that is designed for use with a non-virtualized hardware I/O adapter may be unsuitable for use with a virtualized I/O adapter, such as a single root input/output virtualized (SR-IOV) adapter.

SUMMARY

In a particular embodiment, a computer-implemented method includes allocating a first address translation table in a first portion of a memory in response to detecting a first peripheral component interconnect host bridge. The method includes associating a first address translation table with the first peripheral component interconnect host bridge. The method also includes determining that a first input/output adapter accessible to the first peripheral component interconnect host bridge is configured as a virtualized adapter to provide a plurality of virtual functions to a plurality of logical partitions. The method further includes assigning a first table manager to manage the first address translation table that is associated with the first peripheral component interconnect host bridge in response to determining that the first input/output adapter is configured as the virtualized adapter.

In another particular embodiment, an apparatus includes a processor and a memory to store program code. The program code is executable by the processor to allocate a first address translation table in a first portion of a memory in response to detecting a first peripheral component interconnect host bridge. The program code is executable by the processor to associate a first address translation table with the first peripheral component interconnect host bridge. The program code is further executable by the processor to determine that a first input/output adapter accessible to the first peripheral component interconnect host bridge is configured as a virtualized adapter to provide a plurality of virtual functions to a plurality of logical partitions. The program code is also executable by the processor to assign a first table manager to manage the first address translation table that is associated with the first peripheral component interconnect host bridge. The program code is executable by the processor to configure the first address translation table for an initial number of virtual functions in response to determining that the first input/output adapter is configured as the virtualized adapter.

In another particular embodiment, a computer program product includes a non-transitory computer usable medium having computer usable program code embodied therewith. The computer usable program code is executable by a processor to allocate a first address translation table in a first portion of a memory in response to detecting a first peripheral component interconnect host bridge. The computer usable program code is executable by the processor to associate a first address translation table with the first peripheral component interconnect host bridge. The computer usable program code is executable by the processor to determine that a first input/output adapter accessible to the first peripheral component interconnect host bridge is configured as a virtualized adapter to provide a plurality of virtual functions to a plurality of logical partitions. The computer usable program code is executable by the processor to assign a first table manager to manage the first address translation table that is associated with the first peripheral component interconnect host bridge in response to determining that the first input/output adapter is configured as the virtualized adapter. The computer usable program code is executable by the processor to configure the first address translation table for an initial number of virtual functions.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

DETAILED DESCRIPTION

Figure 1:
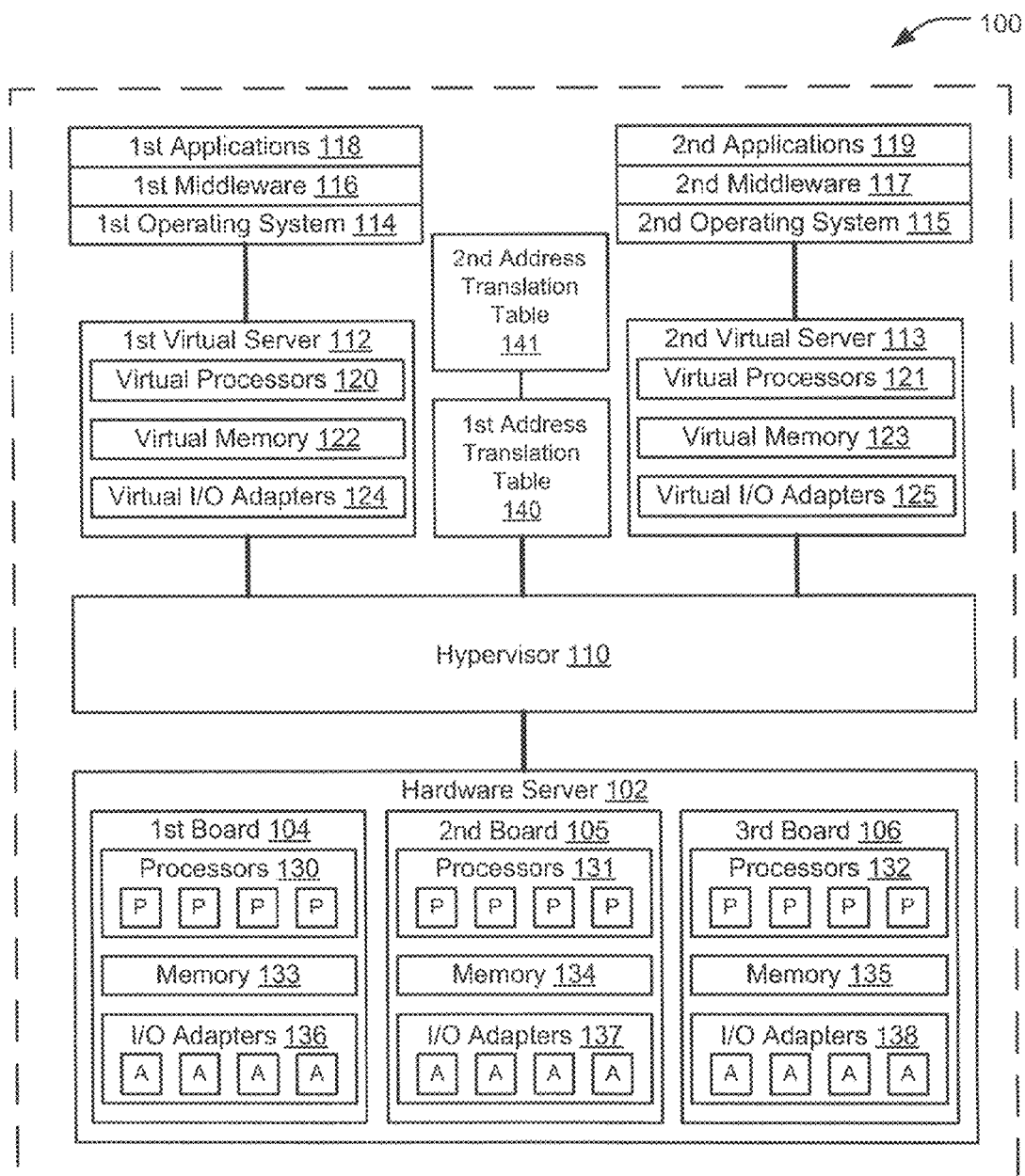
FIG. 1 is a block diagram of a first embodiment of a system that includes an address translation table to enable access to virtual functions.

A virtualized adapter is a single hardware input/output (I/O) adapter that may be capable of hosting multiple virtual I/O adapters. For example, the single hardware I/O adapter may be compliant with a single root I/O virtualized (SR-IOV) adapter specification. The multiple virtual I/O adapters may be referred to as virtual functions. The virtual functions may perform various I/O functions, such as Ethernet I/O functions, network interface card I/O functions, fiber channel I/O, another type of I/O function, or any combination thereof.

In a virtualized computer system, multiple logical partitions may execute substantially concurrently. Each logical partition may execute an operating system and multiple client applications. Each logical partition may be assigned one or more virtual functions to enable the operating system to provide various I/O functions to the client applications. Each virtual function may be associated with an address table. The address translation table may enable the logical partition to access the virtual functions that are associated with the logical partitions.

After a first peripheral component interconnect host bridge is detected, a first address translation table may be allocated in a first portion of a memory. The first address translation table may be associated with the first peripheral component interconnect (PCI) host bridge (PHB). If a first I/O adapter is accessible to the first PHB, a determination may be made whether the first I/O adapter is configured as a virtualized adapter (e.g., capable of providing a plurality of virtual functions to a plurality of logical partitions). If the first I/O adapter is configured as a virtualized adapter, a first table manager may be assigned to manage the first address translation table that is associated with the first PHB. The first table manager may configure the first address translation table for an initial number of virtual functions.

If a request to configure a number of virtual functions for the first I/O adapter is received, a determination may be made whether the number of virtual functions exceeds the initial number of virtual functions. If the number of virtual functions exceeds the initial number of virtual functions, a second address translation table may be allocated in a second portion of the memory. The second portion of the memory may be non-contiguous with reference to the first portion of the memory. The second address translation table may be used for an additional number of virtual functions. The first table manager may be assigned to manage both the first address translation table and the second address table.

Thus, address translation tables for a particular PHB may be allocated in non-contiguous portions of memory. The address translation tables may be managed by a table manager that is associated with the particular PHB. By doing so, memory may be utilized efficiently by allocating an amount of the memory that is appropriate to manage the virtual functions configured at an I/O adapter that is accessible to the particular PHB.

Referring to FIG. 1, a block diagram of a first embodiment of a system that includes an address translation table to enable access to virtual functions is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions, such as virtual servers 112, 113. A logical partition may be a subset of the resources of the hardware server 102 that is virtualized as a separate virtual server. Each of the virtual servers 112, 113 may have its own set of virtual resources, similar to a physical server. For instance, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the virtual servers 112, 113 to the hardware of the hardware server 102. For example, the virtual processors 120, 121 may be mapped to the processors 130-132; the virtual memory 122, 123 may be mapped to memory 133-135, and the virtual I/O adapters 124-125 may be mapped to the I/O adapters 136-138. The hypervisor 110 may manage the selection of portions of the hardware server 102 and their temporary assignment to portions of the virtual servers 112, 113.

In the system 100, a particular I/O adapter of the I/O adapters 136-138 may be virtually divided to enable the particular I/O adapter to be used by more than one virtual server. For instance, the virtual server 112 may use a virtual I/O adapter that is hosted by one of the hardware I/O adapters 136-138. The hypervisor 110 may allocate a first address translation table 140 for one of the I/O adapters 136-138 based on a pre-determined (e.g., initial) number of virtual functions. In response to receiving a request to configure additional virtual functions, the hypervisor 110 may dynamically allocate a second address translation table 141 for the additional virtual functions. The second address translation table 141 may be allocated in a portion of memory that is non-contiguous with reference to the first address translation table 140.

The hypervisor 140 may allocate an address translation table (e.g., the first address translation table 140) based on a pre-determined number of virtual functions. For example, the first address translation table may be allocated when the system 100 is initialized (e.g., booted). The hypervisor 140 may dynamically allocate one or more additional address translation tables (e.g., the address translation table 141) in response to requests to configure additional virtual functions for one or more virtual servers (e.g., the virtual servers 112, 113). The hypervisor 140 may dynamically remove the one or more additional address translation tables (e.g., the address translation table 141) in response to requests to de-configure the additional virtual functions.

Figure 2:
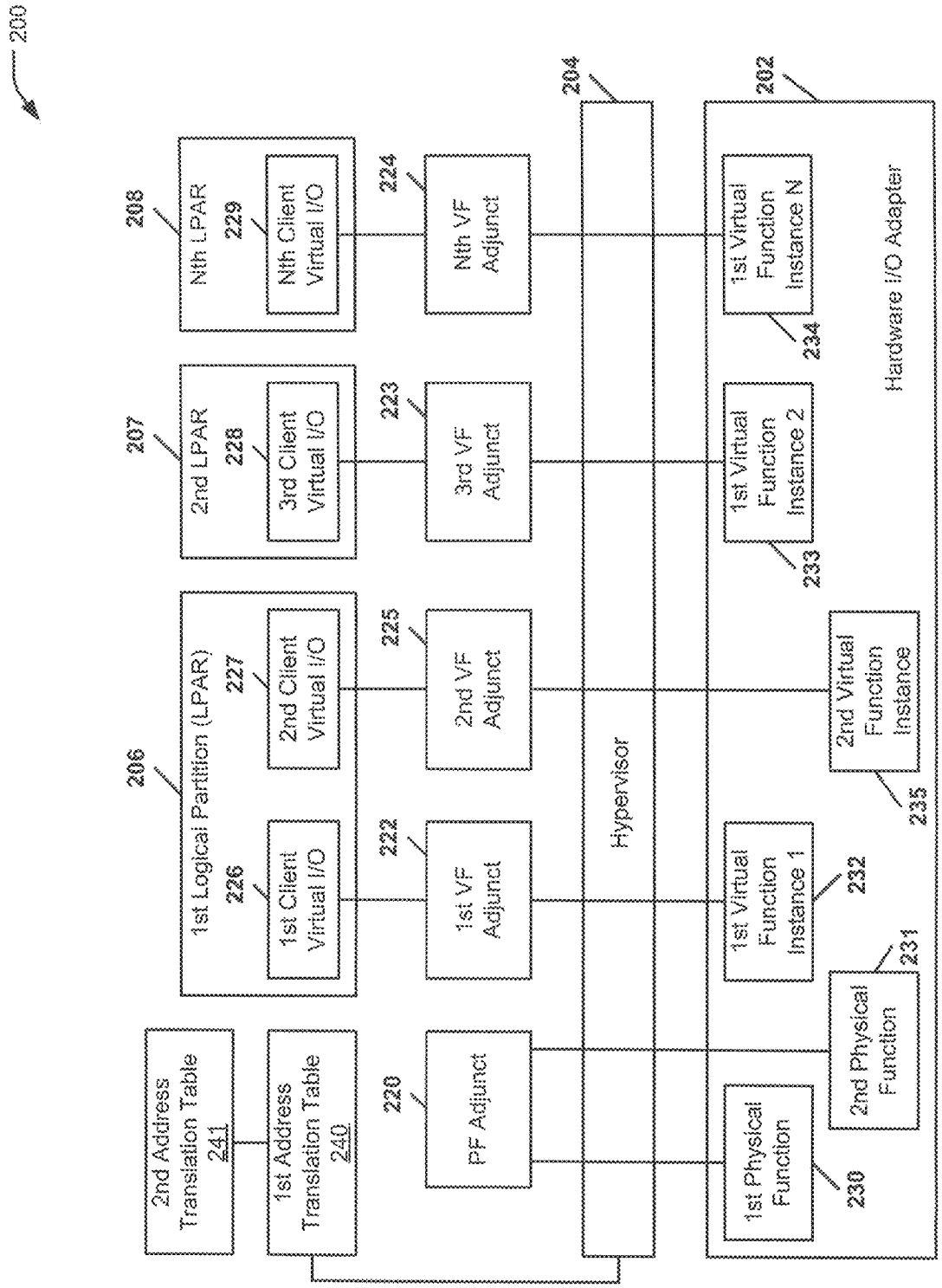
FIG. 2 is a block diagram of a second embodiment of a system that includes an address translation table to enable access to virtual functions.

Referring to FIG. 2, a block diagram of a second embodiment of a system that includes an address translation table to enable access to virtual functions is depicted and generally designated 200. In the system 200, a hypervisor 204 may enable multiple logical partitions to access virtual functions provided by hardware that includes a hardware I/O adapter 202. For instance, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202.

Software module adjuncts, such as a physical function (PF) adjunct 220 and virtual function (VF) adjuncts 222-225, may assist the hypervisor in managing the physical functions 230, 231 and the virtual functions 232-235. For example, a user may specify a particular configuration and the PF adjunct 220 may configure the virtual functions 232-235 from the physical functions 230, 231 accordingly. The VF adjuncts 222-225 may function as virtual device drivers. For instance, just as a device driver for a physical device may enable a client application to access the functions of the device, each of the VF adjuncts 222-225 may enable a client application to access the virtual functions 232-235. In the system 200, the VF adjuncts 222 and 224-225 may enable access to the first virtual function instances 232 and 234-235, and the second VF adjunct 225 may enable access to the second virtual function 235.

The hypervisor 204 may allocate a first address translation table 240 based on an initial (e.g., pre-determined) number of virtual functions and assign the address translation table to the hardware I/O adapter 202. In response to receiving a request to configure additional virtual functions, the hypervisor 204 may dynamically allocate a second address translation table 241 for the additional virtual functions. The hypervisor 204 may assign the second address translation table 241 to the hardware I/O adapter 202. The second address translation table 241 may be allocated in a portion of memory that is non-contiguous with reference to the first address translation table 240.

In operation, the PF adjunct 220 may enable the first virtual function instances 232-234 from the first physical function 230. The PF adjunct 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF adjunct 222. The second client virtual I/O 227 may access the second virtual function 235 via the second VF adjunct 225. A third client virtual I/O 228 executing at the second logical partition 207 may access the second instance of the first virtual function 233 via the third VF adjunct 223. An Nth client virtual I/O 229 executing at the Nth logical partition 208 may access the Nth instance of the first virtual function 233 via the Nth VF adjunct 224.

The hypervisor 204 may allocate an address translation table (e.g., the first address translation table 240) based on a pre-determined number of virtual functions. For example, the first address translation table may be allocated when the system 200 is initialized (e.g., booted). The hypervisor 240 may dynamically allocate one or more additional address translation tables (e.g., the address translation table 241) in response to requests to configure additional virtual functions for one or more logical partitions (e.g., the logical partitions 206-208). The hypervisor 204 may dynamically remove the one or more additional address translation tables (e.g., the address translation table 241) in response to requests to delete/de-configure the additional virtual functions.

Figure 3:
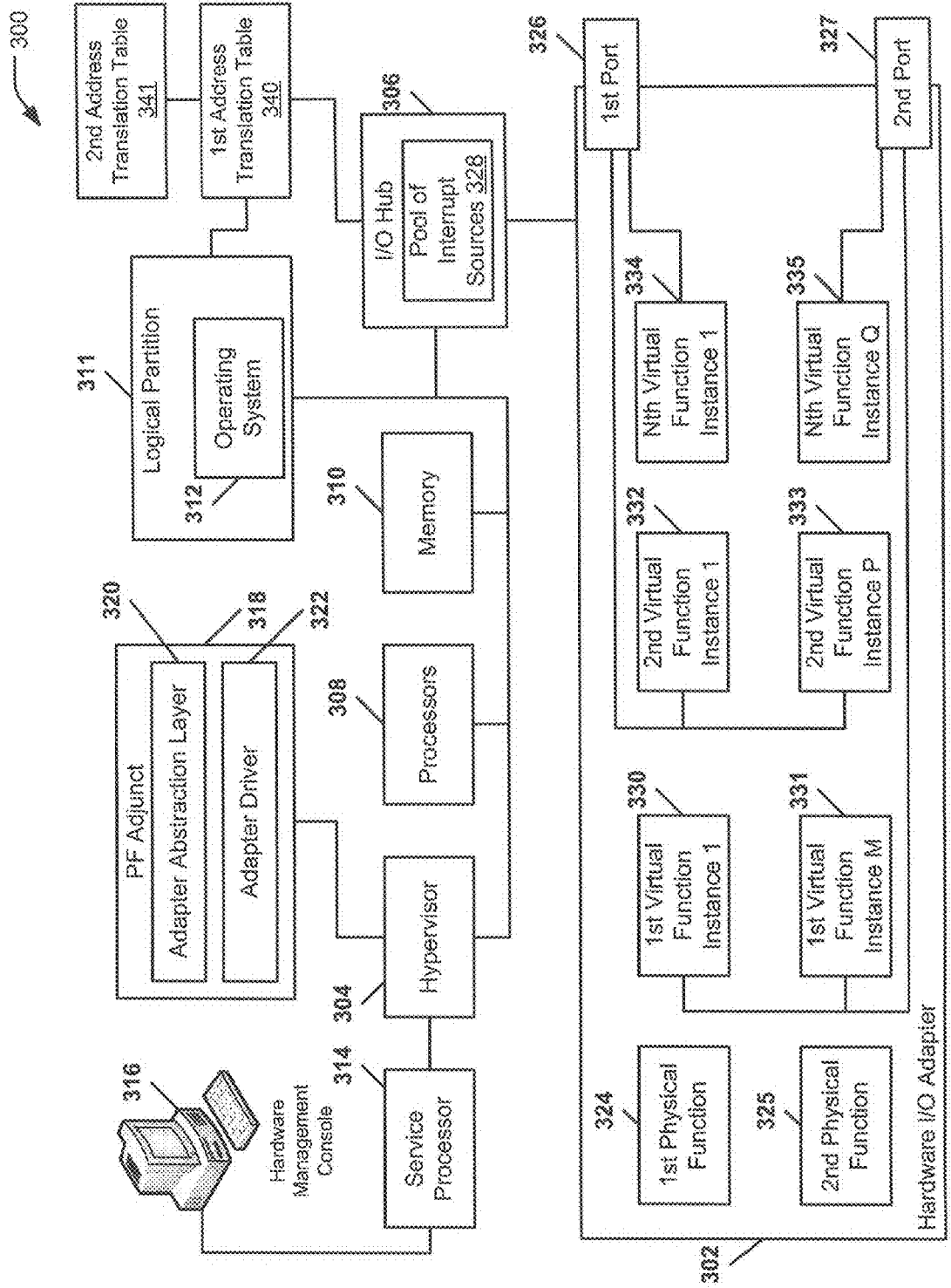
FIG. 3 is a block diagram of a third embodiment of a system that includes an address translation table to enable access to virtual functions.

Referring to FIG. 3, a block diagram of a third embodiment of a system that includes an address translation table to enable access to virtual functions is depicted and generally designated 300. In the system 300, a hypervisor 304 may be coupled to hardware devices, such as a hardware I/O adapter 302, an I/O hub 306, processors 308, and a memory 310. The hypervisor 304 may be coupled to a logical partition 311 that executes an operating system 312. The hypervisor 304 may enable the logical partition 311 to access virtual functions associated with the hardware I/O adapter 302. A physical function (PF) adjunct 318 may be coupled to the hypervisor 304 to manage the physical functions of the hardware I/O adapter 302. A hardware management console 316 may be coupled to the hypervisor 304 via a service processor 314.

The service processor 314 may be a microcontroller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF adjunct 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the hypervisor 304. The I/O hub 306 may enable the hypervisor to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For instance, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the I/O hub 306 to connect to and control I/O devices, such as the hardware I/O adapter 302.

The PF adjunct 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF adjunct 318 may configure virtual functions based on the physical functions 324, 325 and associate the virtual functions with one or more of the ports 326, 327 of the hardware I/O adapter 302. For example, the PF adjunct 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF adjunct 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF adjunct 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

The hypervisor 304 may thus enable access to the virtual functions 330-335 that are associated with the physical functions 324, 325 of the hardware I/O adapter 302. The virtual functions 330-335 of the hardware I/O adapter 302 may be dynamically assigned, as described below.

The hypervisor 304 may allocate a first address translation table 340 based on an initial (e.g., pre-determined minimum) number of virtual functions that is configured for the hardware I/O adapter 302 and may assign the address translation table 340 to the hardware I/O adapter 302. In response to receiving a request to configure additional virtual functions for the hardware I/O adapter 302, the hypervisor 304 may dynamically allocate a second address translation table 341 for the additional virtual functions. The hypervisor 304 may assign the second address translation table 341 to the hardware I/O adapter 302. The second address translation table 341 may be allocated in a portion of memory that is non-contiguous with reference to the first address translation table 340.

The hypervisor 304 may thus allocate an address translation table (e.g., the first address translation table 340) based on a pre-determined number of virtual functions. For example, the first address translation table may be allocated when the system 300 is initialized (e.g., booted). The hypervisor 340 may dynamically allocate one or more additional address translation tables (e.g., the address translation table 341) in response to requests to configure additional virtual functions for one or more logical partitions (e.g., the logical partition 311). The hypervisor 304 may dynamically remove the one or more additional address translation tables (e.g., the second address translation table 341) in response to requests to delete/de-configure the additional virtual functions.

Figure 4:
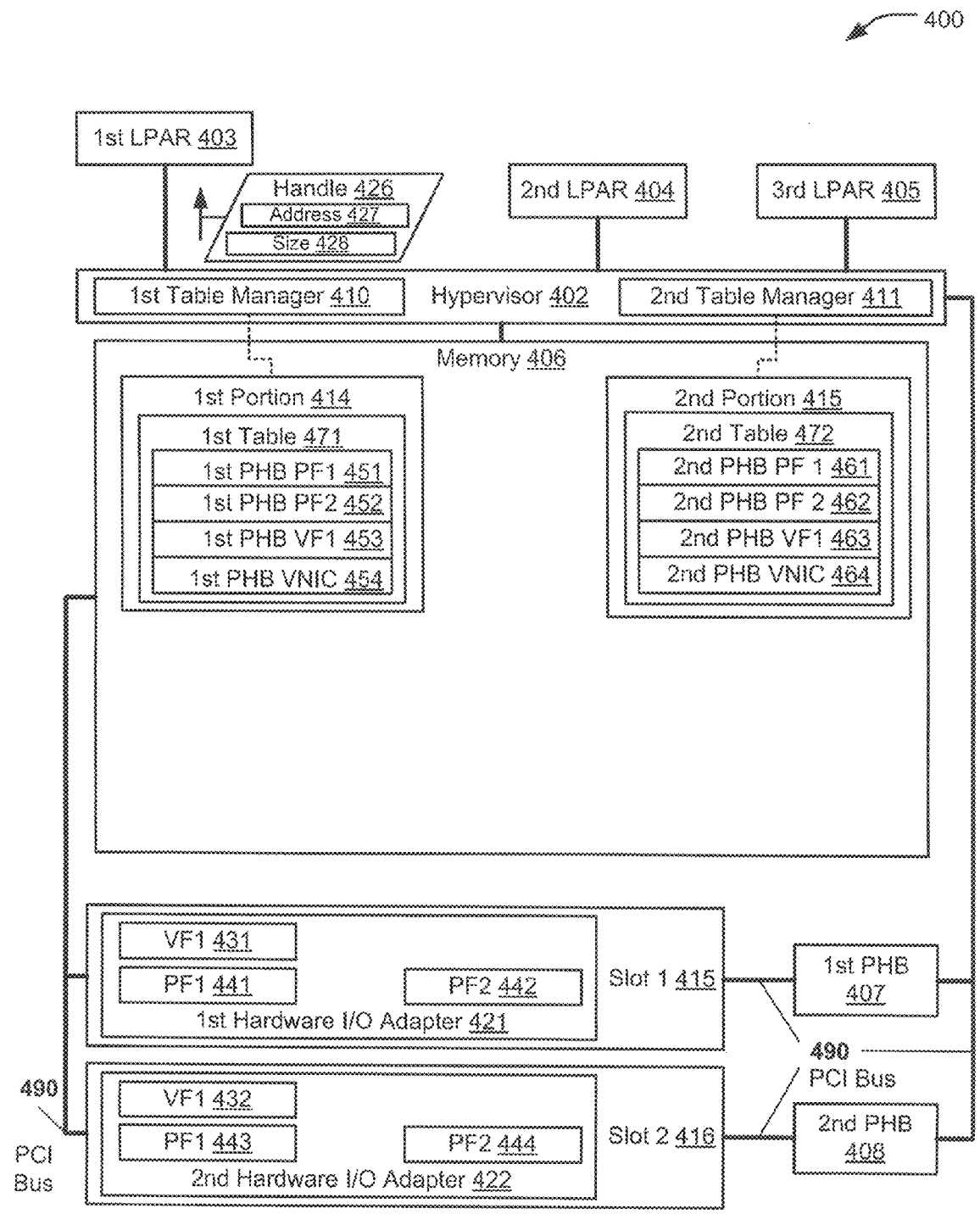
FIG. 4 is a block diagram of a fourth embodiment of a system that includes an address translation table to enable access to virtual functions.

Referring to FIG. 4, a block diagram of a fourth embodiment of a system that includes an address translation table to enable access to virtual functions is depicted and generally designated 400. The system 400 includes a hypervisor 402 that may manage logical partitions, such as a first logical partition (LPAR) 403, a second LPAR 404, and a third LPAR 405. The hypervisor 402 may be coupled via peripheral component interconnect (PCI) bus to a first PCI hub bridge (PHB) 407, a second PHB 408, and a memory 406. The term PCI may also refer to variations and extensions to PCI, such as PCI express (PCIe). The first PHB 407 may be coupled to a first slot 415 via the PCI bus 490. The second PHB 408 may be coupled to a second slot 416 via a PCI bus 490.

A first hardware I/O adapter 421 may be plugged in to the first slot 415. The first hardware I/O adapter 421 may be accessible to the first PHB 407 via the first slot 415. A second hardware I/O adapter 422 may be plugged in to the second slot 416. The second hardware I/O adapter 422 may be accessible to the second PHB 408 via the second slot 416. The hardware I/O adapters 421, 422 may be virtualized I/O adapters that are capable of providing multiple virtual functions to the logical partitions, such as the logical partitions 403-405. For instance, the hardware I/O adapters 421, 422 may be single root I/O virtualized (SR-IOV) adapters.

In operation, the hypervisor 402 may detect the first PHB 407. For example, the hypervisor 402 may detect the first PHB 407 during a discovery process. The discovery process may be used during initialization (e.g., boot-up) to find resources that have been added to the system 400 or to find changes to existing network resources of the system 400. In response to detecting the first PHB 407, the hypervisor 402 may allocate a first table 471 in a first portion 414 of the memory 406. The hypervisor 402 may assign the first table 471 to the first PHB 407. For instance, the first table 471 may be an address translation table that is used to store configuration data associated with physical functions and virtual functions that are hosted by one or more hardware I/O adapters (e.g., the first hardware I/O adapter 421) that are accessible to the first PHB 407. The first table 471 may be used by one or more of the logical partitions 403-405 to access virtual functions that are hosted by the first hardware I/O adapter 421.

A table, such as the first table 471, may include empty slots capable of storing data to enable access to physical functions and virtual functions hosted by a hardware I/O adapter, such as the first hardware I/O adapter 421. When data that enables access to a physical function or a virtual function is added to a slot in the table, the data is referred to as an entry in the table. Thus, as used herein, slot refers to an empty portion of a table and entry (e.g., a table entry) refers to data that is stored in a particular slot of the table.

The hypervisor 402 may determine if the first hardware I/O adapter 421 that is accessible to the first PHB 407 is configured to provide virtual functions (e.g., whether the first hardware I/O adapter 421 is an SR-IOV adapter that is configured to provide virtual functions). If the first hardware I/O adapter 421 is configured to provide virtual functions, the hypervisor 402 may configure an initial number of virtual functions (e.g., a first virtual function 431). The hypervisor 402 may configure one or more physical functions (e.g., physical functions 441, 442). The hypervisor 402 may configure the physical functions before configuring the initial number of virtual functions.

The hypervisor 402 may create a first table manager 410. The hypervisor 402 may assign the first table manager 410 to manage the first table 471. For example, the first table manager 410 may manage the physical functions (e.g., physical functions 441, 442) and virtual functions (e.g., virtual function 431) that are hosted by the first hardware I/O adapter 421. The hypervisor 402, the first table manager 410, or a combination of both may configure the first table 471 based on an initial (e.g., a pre-determined) number of virtual functions. For instance, in FIG. 4, the initial number of virtual functions is one virtual function 431. In FIG. 4, the hypervisor 402 may configure one virtual function 431 for the first hardware I/O adapter 421. The first table manager 410 may add slots to the first table 471 for functions that are hosted by the first hardware I/O adapter 421, such as an entry 451 corresponding to the first physical function 441, an entry 452 corresponding to the second physical function 442, an entry 453 corresponding to the first virtual function 431, and an entry for a virtual network interface card (VNIC) 454.

The hypervisor 402 may detect the second PHB 408. For example, the second PHB 408 may be detected during the discovery process. In response to detecting the second PHB 408, the hypervisor 402 may allocate a second table 472 in a second portion 415 of the memory 406. The second portion 415 may be non-contiguous with reference to the first portion 414 of the memory 406. The hypervisor 402 may assign the second table 472 to the second PHB 408. The second table 472 may be used to store data for managing physical functions and virtual functions that are hosted by the second hardware I/O adapter 422. The hypervisor 402 may determine whether the second hardware I/O adapter 422 that is accessible to the second PHB 408 is configured to provide virtual functions. In response to determining that the second hardware I/O adapter 422 is capable of providing virtual functions, the hypervisor 402 may configure an initial number of virtual functions (e.g., a first virtual function 432) at the second hardware I/O adapter 422. The hypervisor 402 may configure physical functions (e.g. physical functions 443, 444) at the second hardware I/O adapter 422. For instance, the hypervisor 402 may configure the physical functions 443, 444 before configuring the initial number of virtual functions (e.g., the virtual function 432).

The hypervisor 402 may create a second table manager 411 and assign the second table manager 411 to manage the second table 472. For example, the second table manager 411 may configure the second table 472 in the second table 472 based on the virtual functions provided by the second hardware I/O adapter 422. The hypervisor 402, the second table manager 411, or a combination of both may configure the table 472 based on the initial number of virtual functions. For instance, the hypervisor 402, the second table manager 411, or a combination of both may add entries in the second table 472 that correspond to the functions (e.g., the virtual function 432 and the physical functions 443, 444) that are hosted by the second hardware I/O adapter 422. For example, the second table 472 may include an entry 461 corresponding to the first physical function 443, an 462 entry corresponding to the second physical function 444, an entry 463 corresponding to the first virtual function 432, and an entry 464 corresponding to a VNIC function (not shown) hosted by the second hardware I/O adapter 422.

After a table manager (e.g., one of the table managers 410-411) has been assigned to manage an address translation table (e.g., one of the tables 414-415), the hypervisor 402 or the table manager may send a handle 426 to one of the logical partitions 403-405 (e.g., the LPAR 403) to enable access to one or more virtual functions. The handle 426 may include an address 427 and a size 428. For instance, the address 427 may be a starting direct memory access (DMA) address to enable a client application (not shown) executing at the LPAR 403 to utilize DMA to access the one or more virtual functions. The size 428 may indicate a size of a portion (e.g., an entry in one of the tables 471 and 472) of an address translation table that includes data associated with the virtual function that is assigned to the logical partition. For example, if the hypervisor 402 assigns the first virtual function 431 to the first logical partition 403, the address 427 may be an address of the entry 453 of the first table 471 and the size 428 may be a size of the entry 453.

If the hypervisor 402 detects a PHB, such as one of the PHBs 407 and 408, the hypervisor 402 may create an address translation table such as one of the tables 471 and 472 in a portion of the memory 406. The hypervisor 402 may also create a table manager (e.g., one of the table managers 410 and 411) and assign the table manager to manage one of the address translation tables (e.g., one of the tables 471 and 472).

Figure 5:
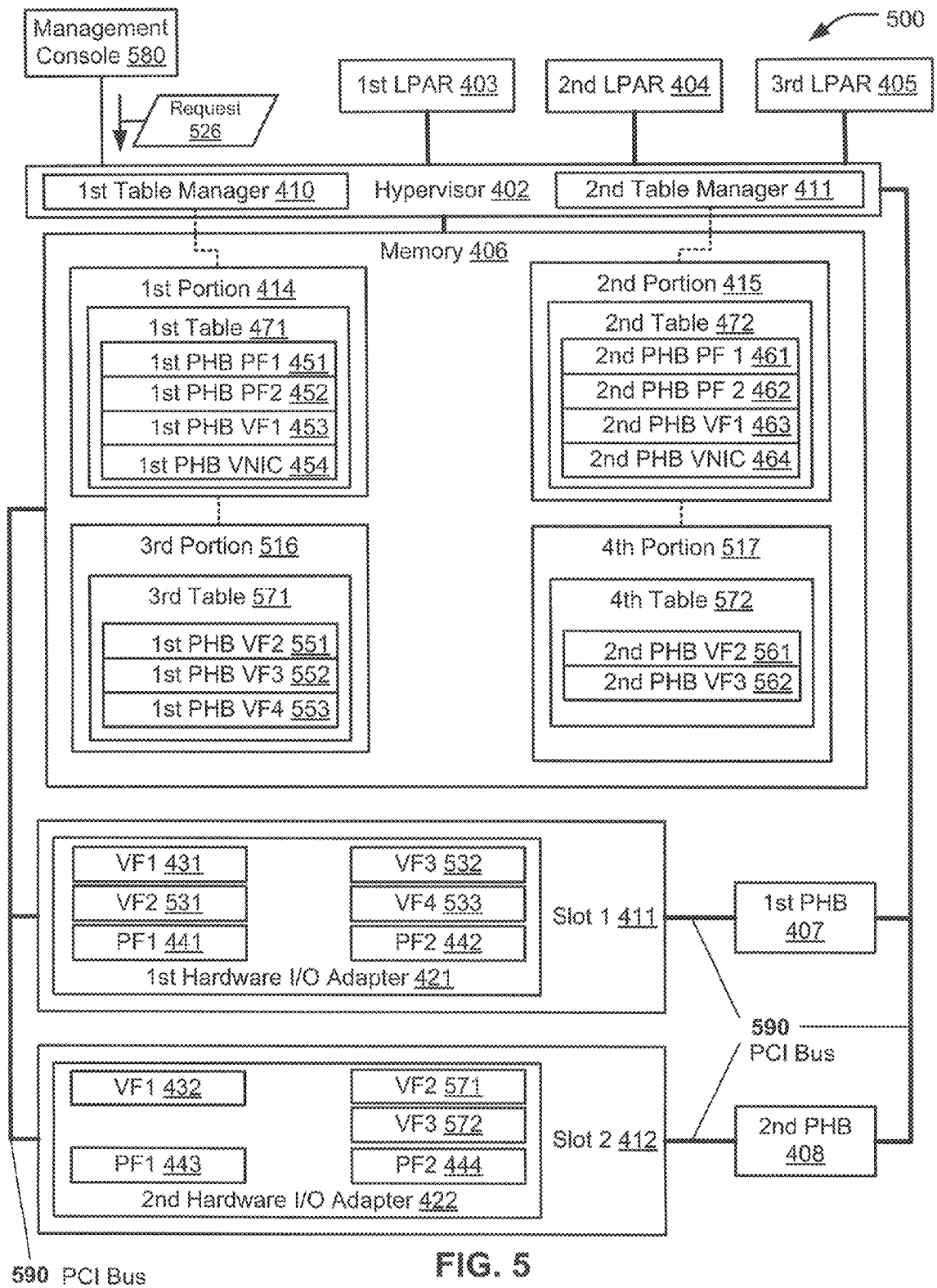
FIG. 5 is a block diagram of a fifth embodiment of a system that includes an address translation table to enable access to virtual functions.

Referring now to FIG. 5, a block diagram of a fifth embodiment of a system that includes an address translation table to enable access to virtual functions is depicted and generally designated 500. The system 500 illustrates the changes to the system 400 of FIG. 4 that may be made in response to receiving a request to configure additional virtual functions.

In operation, the hypervisor 402 may receive a request 426 from a management console 580 to configure a number of virtual functions for a hardware I/O adapter that is accessible to a particular peripheral component interconnect (PCI) host bridge (PHB). After receiving the request 426, the hypervisor 402 may determine whether the requested number of virtual functions is greater than the initial number of virtual functions that were configured. For instance, in FIG. 5, the hypervisor 402 may receive the request 426 to configure four virtual functions. The hypervisor 402 may determine that one virtual function (e.g., the first virtual function 431) was initially configured. The hypervisor 402 may configure three additional virtual functions, such as the virtual functions 531, 532, and 533. If the hypervisor 402 determines that the requested number of virtual functions is less than or equal to the initial number of virtual functions that were configured, the hypervisor 402 may allocate one of the initially configured virtual functions.

The hypervisor 402 may allocate an address translation table, such as a third table 571 in a third portion 516 of the memory 406, to enable access to the additional virtual functions. The third portion 516 may be non-contiguous with reference to one or more of the other portions of the memory 406 (e.g., the first portion 414 and the second portion 415). The hypervisor 402 may assign the first table manager 410 that is assigned to manage tables associated with the first PHB 407 to manage the third table 571. Thus, the first table manager 410 may manage both the first table 471 and the third table 571. The first table manager 410 may add entries to the third table 571 based on the additional virtual functions that were configured. For example, the hypervisor 402 may add an entry 551 that corresponds to the second virtual function 531, an entry 552 that corresponds to the third virtual function 532, and an entry 533 that corresponds to the fourth virtual function 533.

The hypervisor 402 may add additional address translation tables in response to receiving additional requests to configure virtual functions. For instance, the hypervisor 402 may allocate a fifth table (not shown) in a fifth portion (not shown) of the memory 406 in response to receiving another request to configure virtual functions at the first hardware I/O adapter 421. The hypervisor may assign the first table manager 410 to manage the first portion 414, the third portion 516, and the fifth portion of the memory 406.

The request 426 may instruct the hypervisor 402 to configure virtual functions for the second hardware I/O adapter 422 that is associated with the second PHB 408. For example, in FIG. 5, the hypervisor 402 may receive the request 426 to configure three virtual functions for the second hardware I/O adapter 422. The hypervisor 402 may determine that the requested number of virtual functions (e.g., three virtual functions) is greater than the initial number of virtual functions (e.g., one virtual function) that were initially allocated. The hypervisor 402 may configure additional virtual functions, such as a second virtual function 571 and a third virtual function 572, which are hosted by the second hardware I/O adapter 422.

The hypervisor 402 may allocate an address translation table, such as a fourth table 572, in a fourth portion 517 of the memory 406. The fourth portion 517 may be non-contiguous with reference to other portions of the memory 406 (e.g., the portions 414, 415, and 516). The second table manager 411 may be assigned to manage the fourth table 572. The second table manager 411 may add entries to the fourth table 572 that correspond to the additional virtual functions that were configured at the second hardware I/O adapter 422. For instance, the second table manager 411 may add an entry 561 that corresponds to the second virtual function 571 and an entry 562 that corresponds to the third virtual function 562.

The request 426 may instruct the hypervisor 402 to delete one or more of the configured virtual functions. For example, the hypervisor 402 may receive the request 426 to delete the virtual functions 532 and 533. The hypervisor 402 may delete the virtual functions 532 and 533 at the first hardware I/O adapter 421. The first table manager 410 may delete the corresponding entries 552 and 553 to create two empty slots in the third table 571. The hypervisor 402 may determine that the third table 571 includes at least one entry (e.g., the entry 551) after deleting the entries 552 and 553. The hypervisor 402 may use one or both of the empty slots when the hypervisor 402 is instructed to configure one or two additional virtual functions. If the hypervisor 402 is instructed to configure three additional virtual functions after the entries 552 and 553 have been deleted, the hypervisor 402 may use the two empty slots in the third table and allocate an additional (e.g., a fifth table) for the third virtual function.

As another example, the hypervisor 402 may receive instructions to delete the virtual functions 531-533. The hypervisor 402 may delete the virtual functions 531-533 at the first hardware I/O adapter 421. The first table manager 410 may delete the corresponding entries 551-553 to create three empty slots in the third table 571. After deleting the entries 551-553, the hypervisor 402 may determine whether the third table 571 includes any entries (i.e., data in the slots). The hypervisor may determine whether the third table 571 was allocated to enable access to the initially configured virtual functions (e.g., the first virtual function 453). In response to determining that the third table 571 does not include any entries and that the third table 571 was not allocated to enable access to the initially configured virtual functions, the hypervisor 402 may delete the third portion 516 that includes the third table 571 to enable the third portion 516 of the memory 406 to be reused. If a table, such as the first table 471, does not include any entries, and the table was allocated to enable access to the initially configured virtual functions, the hypervisor 402 may preserve the table to enable reuse of the slots in the table.

If the hypervisor 402 receives a request to configure virtual functions for an I/O adapter that is accessible to a particular PHB, the hypervisor may determine whether the requested number of virtual functions is greater than the number of initially allocated virtual functions. If the requested number of virtual functions is greater than the allocated number of virtual functions, the hypervisor 402 may allocate an additional table in a non-contiguous portion of the memory 406 and may assign a table manager that is associated with the particular PHB to manage the allocated table. The table manager may add entries into the allocated table that correspond to the additional virtual functions of the hardware I/O adapter. In this way, virtual functions may be dynamically added without having to pre-allocate (e.g., prior to runtime) a large amount of memory for each PHB.

Figure 6:
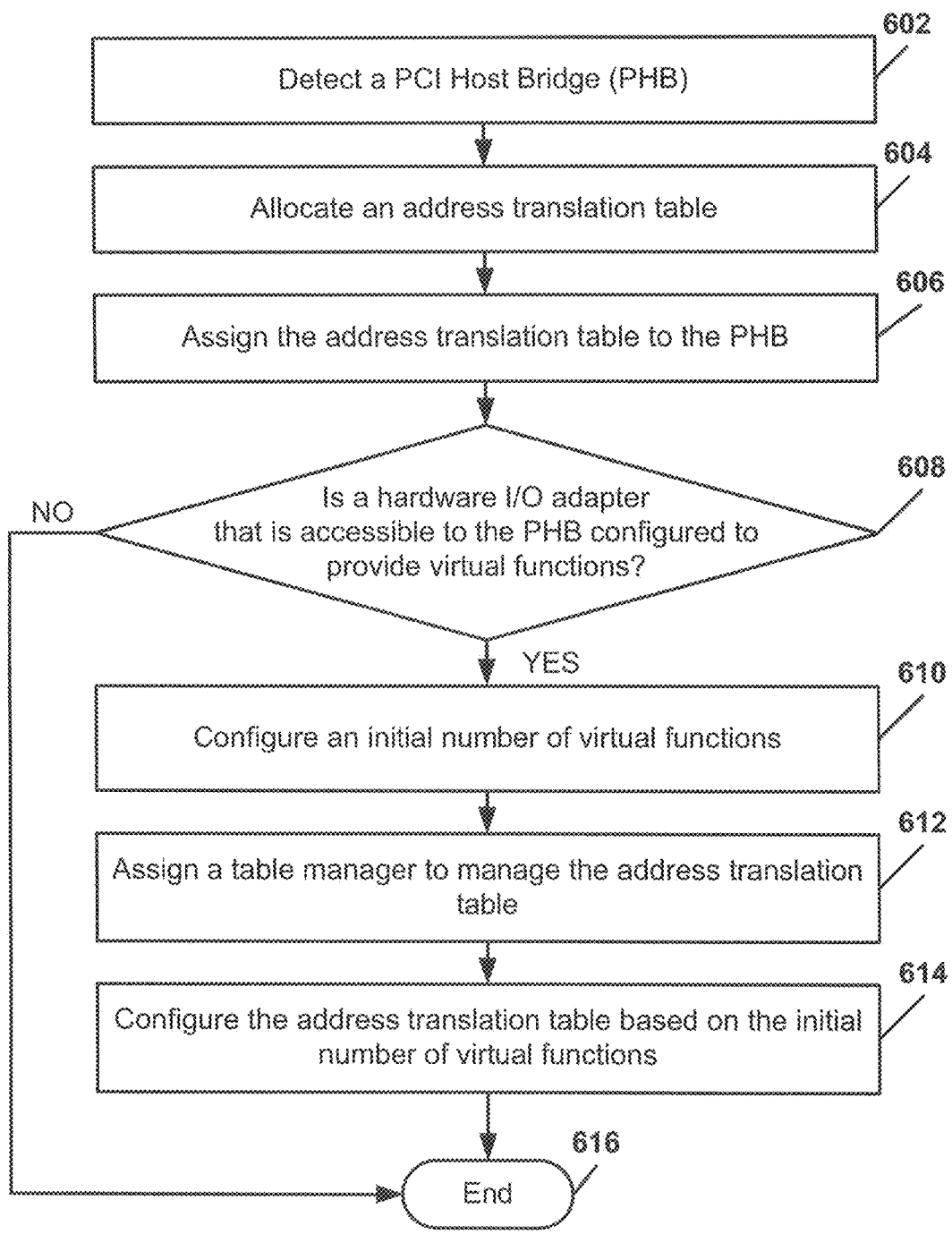
FIG. 6 is a flow diagram of a first method to enable access to virtual functions via an address translation table.

FIG. 6 is a flow diagram of a first method to enable access to virtual functions via an address translation table is depicted. The method may be performed by a hypervisor such as the hypervisor 110 of FIG. 1, the hypervisor 204 of FIG. 2, the hypervisor 304 of FIG. 3, and the hypervisor 406 of FIG. 4 and FIG. 5.

A peripheral component interconnect (PCI) host bridge (PHB) may be detected at 602. Moving to 604, an address translation table may be allocated. Advancing to 606, the address translation table may be assigned to the PHB. For instance, in FIG. 4, the hypervisor 402 may detect the first PHB 407, may allocate the table 471, and may assign the table 471 for use with the first PHB 407.

Proceeding to 608, a determination may be made as to whether a hardware input/output (I/O) adapter that is accessible to the PHB is configured to provide virtual functions. If the hardware I/O adapter that is accessible to the PHB is not configured to provide virtual functions, the method may end at 616. If the hardware I/O adapter that is accessible to the PHB is configured to provide virtual functions, the method may proceed to 610 where an initial number of virtual number of functions is configured for the hardware I/O adapter. Moving to 612, a table manager may be assigned to manage the address translation table. Advancing to 614, the address translation table may be configured based on the initial number of virtual functions. For example in FIG. 4, the hypervisor 402 may allocate a initial number of virtual functions such as a first virtual function 431 for the first hardware I/O adapter 421, that is accessible to the first PHB 407. The hypervisor 402 may assign the first table manager 410 to manage the first table 471. The first table manager 410 may configure the table 471 based on the initial number of virtual functions. For instance, the table manager 410 may add entries in the table 471 that correspond to physical functions and virtual functions that were initially configured for the first hardware I/O adapter 421. The method may end at 616.

If a hypervisor receives a request to configure virtual functions for an I/O adapter that is accessible to a particular PHB, the hypervisor may determine whether the requested number of virtual functions is greater than the number of initially allocated virtual functions. If the requested number of virtual functions is greater than the allocated number of virtual functions, the hypervisor may allocate an additional table in a non-contiguous portion of memory and assign a table manager that is associated with the particular PHB to manage the allocated table. The table manager may add entries into the allocated table that correspond to the additional virtual functions configured at the hardware I/O adapter. In this way, virtual functions may be dynamically added without having to pre-allocate (e.g., prior to runtime) a large amount of memory for an address translation table for each PHB.

Figure 7:
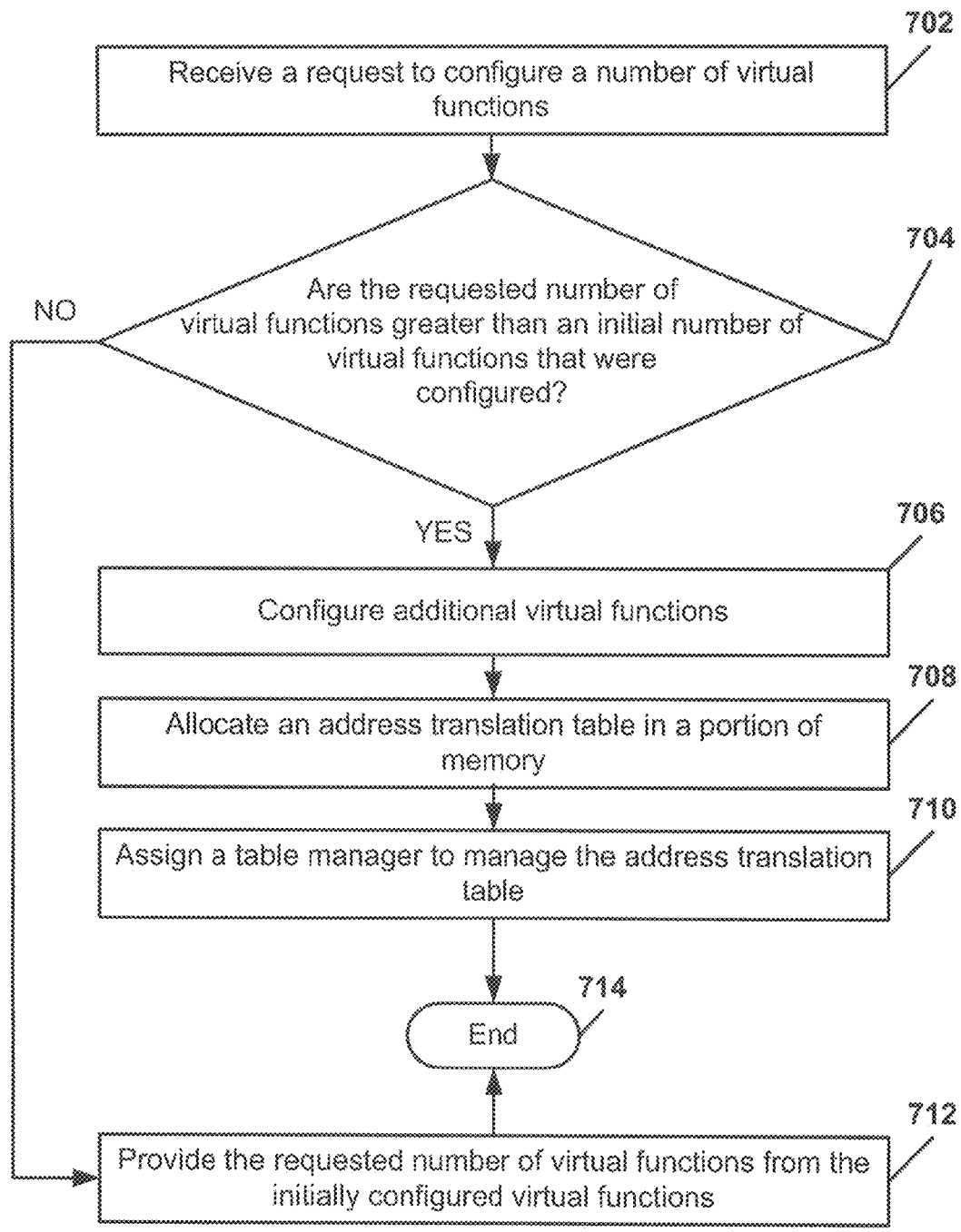
FIG. 7 is a flow diagram of a second method to enable access to virtual functions via an address translation table.

Referring to FIG. 7, a flow diagram of a second method to enable access to virtual functions via an address translation table is depicted. The method may be performed by a hypervisor such as the hypervisor 110 of FIG. 1, the hypervisor 204 of FIG. 2, the hypervisor 304 of FIG. 3, and the hypervisor 406 of FIG. 4 and FIG. 5.

A request to allocate a number of virtual functions may be received at 702. For example, the request may be received from a hardware management console, such as the hardware management console 316 of FIG. 3 and the management console 580 of FIG. 5. Moving to 704, a determination may be made whether the requested number of virtual functions is greater than an initial number of virtual functions that were configured. If it is determined at 704 that the requested number of virtual functions is greater than an initial number of virtual functions that were configured, then additional virtual functions may be configured at 706. For instance, in FIG. 5, the hypervisor 402 may receive the request 426 to configure four virtual functions that are hosted by the first hardware I/O adapter 421. The hypervisor 402 may determine that the initial number of virtual functions was one (e.g., the first virtual function 431) and configure the virtual functions 531-533.

Advancing to 708, an address translation table may be allocated in a portion of memory. Continuing to 710, a table manager may be assigned to manage the address translation table and the method may end at 714. For example, in FIG. 5, the hypervisor 402 may allocate the third table 571 in the third portion 516 of the memory 406. The hypervisor 402 may assign the first table manager 410 that is assigned to first PHB 407 to manage the third table 571.

If it is determined, at 704, that the requested number of virtual functions is less than or equal to the initial number of virtual functions that were configured, then the requested number of virtual functions may be provided from the initially configured virtual functions, at 712, and the method may end at 714.

If a request to configure virtual functions is received, a determination may be made whether the number of requested virtual functions is greater than an initial number of virtual functions that were configured. If the number of requested virtual functions is greater than the initial number of virtual functions that were configured, additional virtual functions may be configured. An additional table may be allocated in an additional portion of memory and a table manager may be assigned to manage the additional table. The table manager may add entries to the additional table that correspond to the additional virtual functions. In this way, additional address translation tables may be dynamically created without having to pre-allocate (e.g., prior to runtime) a large amount of memory for address translation tables for each PHB.

Figure 8:
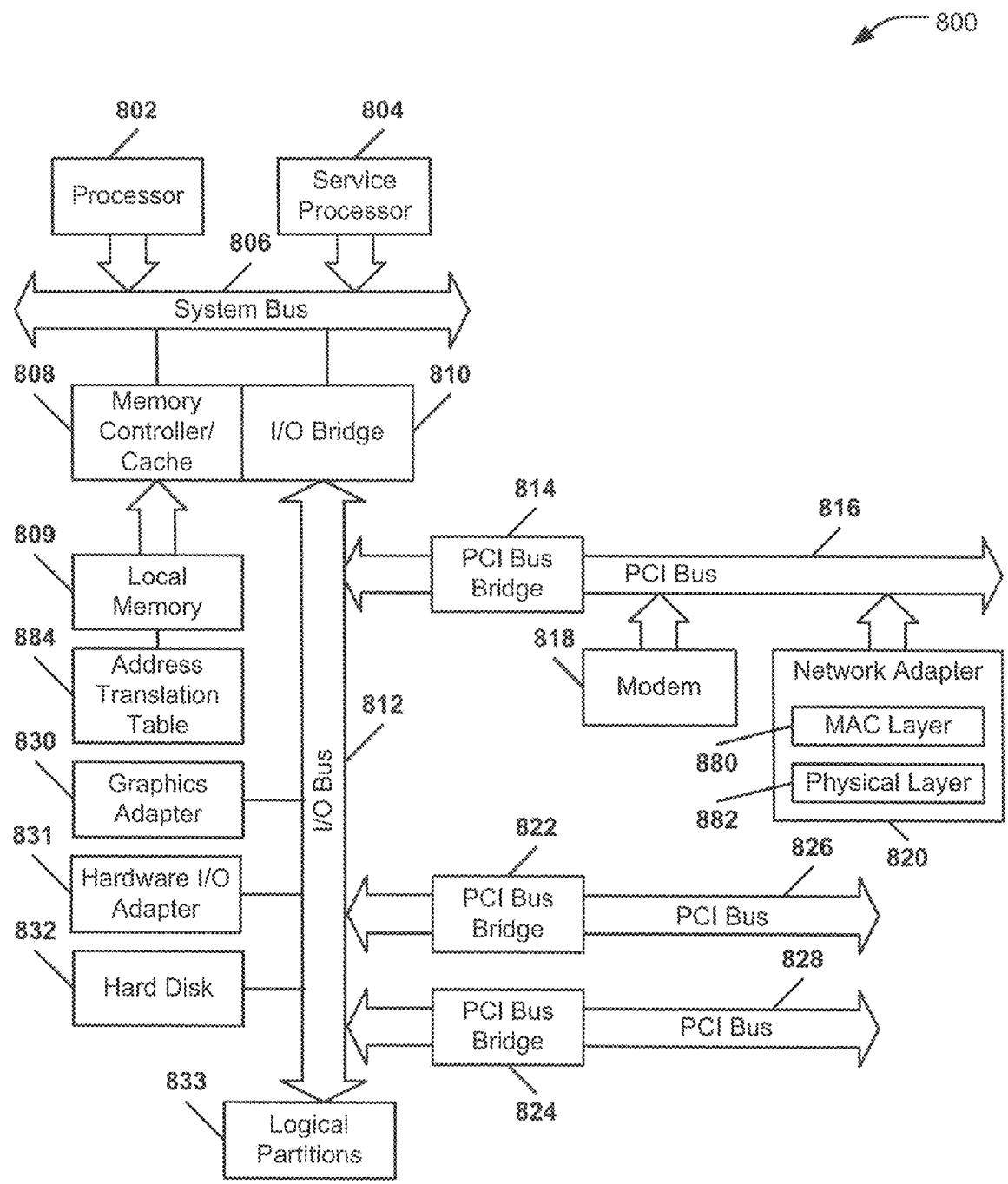
FIG. 8 is a block diagram of an illustrative embodiment of a general computer system.

FIG. 8 is a block diagram of an illustrative embodiment of a general computer system is depicted and generally designated 800. The data processing system 800 may be a symmetric multiprocessor (SMP) system that includes a plurality of shared processors or SMT-capable processors, such as processors 802 and 804 connected to system bus 806. Alternatively, a single processor system may be employed. In the depicted example, processor 804 may be a service processor. Each SMT-capable processor may be capable of concurrently executing multiple hardware threads on the one processor.

Connected to system bus 806 may be memory controller/cache 808, which provides an interface to local memory 809. An address translation table 884 may be located in the local memory 809. The address translation table 884 may enable logical partitions 833 to access virtual functions of a hardware I/O adapter 831. The address translation table 884 may include entries corresponding to initially configured virtual functions. An I/O bus bridge 810 may be connected to a system bus 806 to provide an interface to I/O bus 812. A memory controller/cache 808 and an I/O bus bridge 810 may be integrated as depicted.

A peripheral component interconnect (PCI) bus bridge 814 connected to I/O bus 812 may provide an interface to PCI local bus 816. In FIG. 8, the term PCI in this application may also refer to variations and extensions of PCI, such as PCI express (PCIe). Multiple modems may be connected to PCI bus 816. Typical PCI bus implementations may support PCI expansion slots or add-in connectors. Communications links to network computers may be provided via modem 818 and network adapter 820 connected to PCI local bus 816 through add-in boards.

Network adapter 820 may include a physical layer 882 which enables analog signals to go out to a network, such as for example, an Ethernet network via an R45 connector. A media access controller (MAC) 880 may be included within network adapter 820. Media access controller (MAC) 880 may be coupled to bus 816 and processes digital network signals. MAC 880 may serve as an interface between bus 816 and physical layer 882. MAC 880 may perform a number of functions involved in the transmission and reception of data packets. For instance, during the transmission of data, MAC 880 may assemble the data to be transmitted into a packet that includes address and error detection fields. During the reception of a packet, MAC 880 may disassemble the packet and perform address checking and error detection. In addition, MAC 880 may perform encoding/decoding of digital signals prior to transmission, perform preamble generation/removal, and bit transmission/reception.

Additional PCI bus bridges 822 and 824 may provide interfaces for additional PCI buses 826 and 828, from which additional modems or network adapters may be supported. In this manner, data processing system 800 may allow connections to multiple network computers. A memory-mapped graphics adapter 830 and hard disk 832 may be directly or indirectly connected to I/O bus 812.

Service processor 804 may interrogate system processors, memory components, and I/O bridges to generate and inventory the system 800. Service processor 804 may execute Built-In-Self-Tests (BISTs), Basic Assurance Tests (BATs), and memory tests on one or more of the elements in the system 800. Any error information for failures detected during the BISTs, BATs, and memory tests may be gathered and reported by service processor 804.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A computer-implemented method, comprising:
    allocating a first address translation table in a first portion of a memory in response to detecting a first peripheral component interconnect host bridge;
    associating the first address translation table with the first peripheral component interconnect host bridge;
    determining that a first input/output adapter accessible to the first peripheral component interconnect host bridge is configured as a virtualized adapter to provide a plurality of virtual functions to a plurality of logical partitions;
    in response to determining that the first input/output adapter is configured as the virtualized adapter, assigning a first table manager to manage the first address translation table that is associated with the first peripheral component interconnect host bridge; and
    configuring the first address translation table for an initial number of virtual functions.

2. The computer-implemented method of claim 1, further comprising:
    allocating a second address translation table in a second portion of memory in response to detecting a second peripheral component interconnect host bridge;
    associating the second address translation table with the second peripheral component interconnect host bridge;
    in response to determining that a second input/output adapter is configured as the virtualized adapter, configuring the second address translation table for the initial number of virtual functions; and
    assigning a second table manager to manage the second address translation table that is associated with the second peripheral component interconnect host bridge.

3. The computer-implemented method of claim 1, further comprising:
    receiving a request from a management console to assign a number of virtual functions to a logical partition of the plurality of logical partitions; and
    in response to determining that the requested number of virtual functions is greater than the initial number of virtual functions, configuring additional virtual functions.

4. The computer-implemented method of claim 3, further comprising:
    allocating a third address translation table in a third portion of the memory; and
    creating entries in the third address translation table for the additional virtual functions.

5. The computer-implemented method of claim 4, wherein the third portion of the memory is non-contiguous with reference to the first portion of the memory and with reference to the second portion of the memory.

6. The computer-implemented method of claim 5, further comprising assigning the first table manager to manage the third address translation table.

7. The computer-implemented method of claim 1, further comprising:
    receiving a second request from a management console to assign a number of virtual functions to a logical partition of the plurality of logical partitions; and
    in response to determining that the requested number of virtual functions is greater than the initial number of virtual functions, configuring additional virtual functions.

8. The computer-implemented method of claim 2, further comprising allocating a fourth address translation table in a fourth portion of the memory.

9. The computer-implemented method of claim 8, wherein the fourth portion of the memory is non-contiguous with reference to the first portion of the memory and with reference to the fourth portion of the memory.

10. The computer-implemented method of claim 8, further comprising assigning the second table manager to manage the fourth address translation table.

11. The computer-implemented method of claim 1, further comprising detecting the first peripheral component interconnect host bridge at a hypervisor of a computing system, the hypervisor enabling the plurality of logical partitions to execute at the computing system.

12. An apparatus, comprising:
    a processor; and
    a memory to store program code, the program code executable by the processor to allocate a first address translation table in a first portion of a memory in response to detecting a first peripheral component interconnect host bridge, to associate the first address translation table with the first peripheral component interconnect host bridge, to determine that a first input/output adapter accessible to the first peripheral component interconnect host bridge is configured as a virtualized adapter to provide a plurality of virtual functions to a plurality of logical partitions, to assign a first table manager to manage the first address translation table that is associated with the first peripheral component interconnect host bridge, and to configure the first address translation table for an initial number of virtual functions in response to determining that the first input/output adapter is configured as the virtualized adapter.

13. The apparatus of claim 12, wherein the program code is further executable by the processor to allocate a second address translation table in a second portion of memory in response to detecting a second peripheral component interconnect host bridge, to associate the second address translation table with the second peripheral component interconnect host bridge, to assign a second table manager to manage the second address translation table that is associated with the second peripheral component interconnect host bridge in response to determining that a second input/output adapter is configured as the virtualized adapter, and to configure the second address translation table for the initial number of virtual functions.

14. The apparatus of claim 13, wherein the program code is further executable by the processor to receive a request from a management console to assign a number of virtual functions to a logical partition of the plurality of logical partitions and to configure additional virtual functions.

15. The apparatus of claim 14, wherein the program code is further executable by the processor to allocate a third address translation table in a third portion of the memory, wherein the third portion of the memory is non-contiguous with reference to the first portion of the memory and with reference to the second portion of the memory.

16. The apparatus of claim 15, wherein the program code is further executable by the processor to assign the first table manager to manage the third address translation table.

17. The apparatus of claim 13, wherein the program code is further executable by the processor to configure additional virtual functions in response to receiving a second request to assign a number of virtual functions to a logical partition of the plurality of logical partitions.

18. The apparatus of claim 17, wherein the program code is further executable by the processor to allocate a fourth address translation table in a fourth portion of the memory, wherein the fourth portion of the memory is non-contiguous with reference to the first portion of the memory and with reference to the fourth portion of the memory.

19. The apparatus of claim 18, wherein the program code is further executable by the processor to assign the second table manager to manage the fourth address translation table.

20. A computer program product comprising a non-transitory computer usable medium having computer usable program code embodied therewith, the computer usable program code executable by a processor to:
- allocate a first address translation table in a first portion of a memory in response to detecting a first peripheral component interconnect host bridge;
- associate the first address translation table with the first peripheral component interconnect host bridge;
- determine that a first input/output adapter accessible to the first peripheral component interconnect host bridge is configured as a virtualized adapter to provide a plurality of virtual functions to a plurality of logical partitions;
- assign a first table manager to manage the first address translation table that is associated with the first peripheral component interconnect host bridge in response to determining that the first input/output adapter is configured as the virtualized adapter; and
- configure the first address translation table for an initial number of virtual functions.

* * * * *